United States Patent [19]
Barnett

[11] 4,191,392
[45] Mar. 4, 1980

[54] OCCUPANT RESTRAINT CUSHION SYSTEM

[75] Inventor: Ronald R. Barnett, Rochester, Mich.
[73] Assignee: General Motors Corporation, Detroit, Mich.
[21] Appl. No.: 936,353
[22] Filed: Aug. 24, 1978
[51] Int. Cl.² .............................................. B62D 21/08
[52] U.S. Cl. ..................................................... 280/740
[58] Field of Search ............... 280/740, 728, 729, 732, 280/741, 742, 743

[56] References Cited
U.S. PATENT DOCUMENTS

| | | | |
|---|---|---|---|
| 3,794,346 | 2/1974 | Brockman | 280/740 |
| 3,904,222 | 9/1975 | Bursott et al. | 280/740 |
| 4,153,273 | 5/1979 | Risko | 280/740 |

*Primary Examiner*—David M. Mitchell
*Attorney, Agent, or Firm*—Edward J. Biskup

[57] ABSTRACT

An occupant restraint cushion system including a housing provided with a J-shaped base wall connected to a pair of laterally spaced side walls with one of the side walls having an enlarged circular opening formed therein and the other side wall having an aperture formed therein. A gas generator-diffuser combination is mounted in the opening with a threaded stud fixed with one end of the gas generator extending through the aperture and adapted to have a nut tightened thereon so as to draw the gas generator towards the associated apertured side wall and cause said one end of the gas generator together with the associated side wall and diffuser to define a chamber that communicates with the interior of the cushion through a portion of the diffuser that is spaced from the other of the side walls.

2 Claims, 9 Drawing Figures

OCCUPANT RESTRAINT CUSHION SYSTEM

This invention concerns occupant restraint cushion systems in general, and more particularly relates to an occupant restraint cushion assembly that is mountable in the instrument panel of a vehicle and serves to inflate a cushion upon energization of a gas generator.

Copending patent application Ser. No. 896,352, now U.S. Pat. No. 4,153,273 filed on Apr. 14, 1978, in the name of Richard C. Risko and assigned to the assignee of this invention, discloses an occupant restraint cushion system which comprises an elongated housing adapted to be fixedly mounted in the instrument panel of a motor vehicle. The housing includes a J-shaped base wall connected to first and second laterally spaced side walls with the first side wall having an enlarged opening formed therein and the second side wall being formed with an aperture. An elongated tubular diffuser extends between the side walls and has one end thereof formed with a radially outwardly flared conical portion while the other end of the diffuser is formed with integral guide means. A gas generator is positioned in the diffuser and has a threaded stud at one end that extends through the aperture in the second side wall while the other end of the gas generator is formed with an annular tapered flange adapted to fit within the conical portion of the diffuser. The arrangement is such that after the diffuser is inserted within a suitable opening formed in a restraint cushion and is rigidly connected to the housing, the gas generator is positioned within the diffuser with the threaded stud passing through the aperture in the second side wall after which a nut is placed on the threaded stud and is tightened causing the annular tapered flange on the gas generator to be drawn towards and cooperate with the conical portion of the diffuser for effecting a seal at one end of the gas generator while simultaneously clamping a portion of the cushion between the other end of the gas generator and the second side wall.

In order to realize a seal at both ends of the gas generator-diffuser combination described above, it has been necessary to maintain close dimensional tolerances during manufacture of the various components of the occupant restraint system. This is required because if the gas generator should be of a greater length than called for by specifications, the stud end of the gas generator will abut the side wall prior to the tapered flange effecting the seal with the outwardly flared conical portion of the diffuser. On the other hand, if the gas generator is shorter in length than specifications require, the seal at the stud end of the gas generator cannot be made without buckling the side wall and/or causing the diffuser to be physically drawn towards the stud end of the generator.

The present invention alleviates the above problem by providing an improved occupant restraint cushion system in which the stud end of the gas generator is spaced from the associated side wall and one end of the diffuser contacts the cushion material adjacent the same wall. In this manner, the tapered flange of the gas generator always provides a good seal with the conical end of the diffuser, and when the nut is tightened on the stud, the other end of the diffuser will cooperate with the adjacent side wall to prevent the latter from buckling and also provide a seal therewith. In addition, a vent is provided at one end of the diffuser adjacent the stud end of the gas generator so as to prevent any pressure build-up at the latter mentioned end of the gas generator.

The objects of the present invention are to provide a new and improved occupant restraint cushion system that includes a cylindrical diffuser supported within a J-shaped housing and having a radially outwardly flared conical portion formed at one end for cooperation with a conically shaped tapered flange portion of a gas generator for providing a seal therebetween while simultaneously having the opposite end of the diffuser engage a portion of the cushion and together with the end wall form a seal at said opposite end of the diffuser; to provide a new and improved occupant restraint cushion assembly including a gas generator having a threaded stud at one end and a conically shaped head at the other end with the gas generator being concentrically located within a cylindrical diffuser in a manner so as to clamp one portion of an inflatable cushion between the conically shaped head and an outwardly flared portion of the diffuser and clamp another portion of the cushion between the opposite end of the diffuser and one side wall of a support housing, and to provide a new and improved occupant restraint cushion assembly having a gas generator and a diffuser located within a restraint cushion with a portion of the cushion being clamped between a conically shaped end of the diffuser and a complimentary shaped portion of the gas generator while the other end of the diffuser has a vent formed therein and presses another portion of the cushion against one wall of the housing to provide a seal therebetween.

Other objects and advantages of the invention will be more apparent from the following detailed description when taken with the drawings in which.

Figure 1:
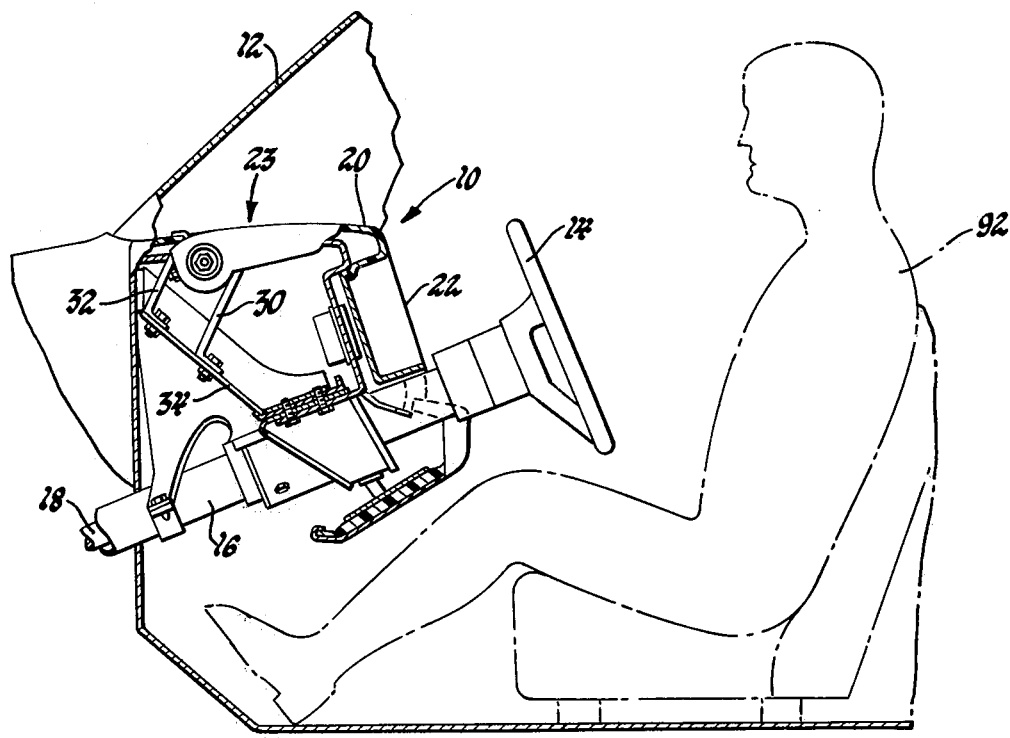
FIG. 1 is a view showing an occupant restraint cushion assembly made in accordance with the invention housed within the upper portion of a motor vehicle instrument panel.
Figure 3:
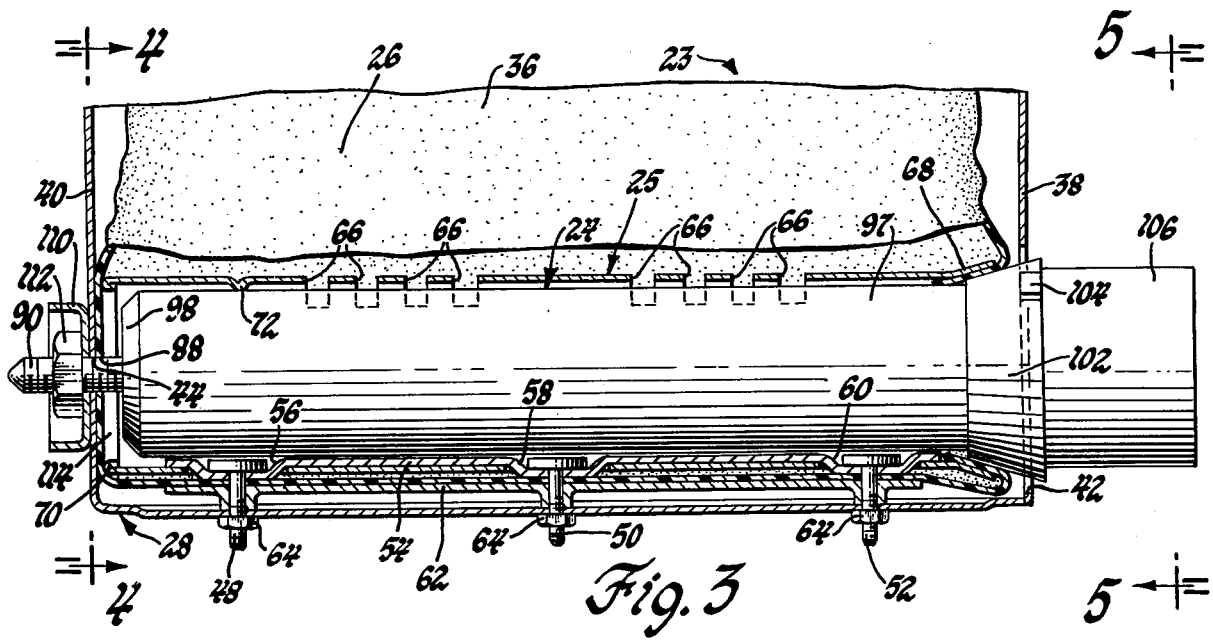
FIG. 3 is a sectional view of the occupant restraint cushion assembly taken on line 3—3 of FIG. 2.
Figure 4:
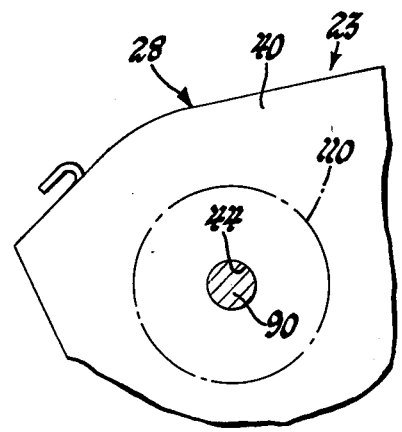
FIG. 4 is a side view of the occupant restraint cushion assembly taken on line 4—4 of FIG. 3.
Figure 5:
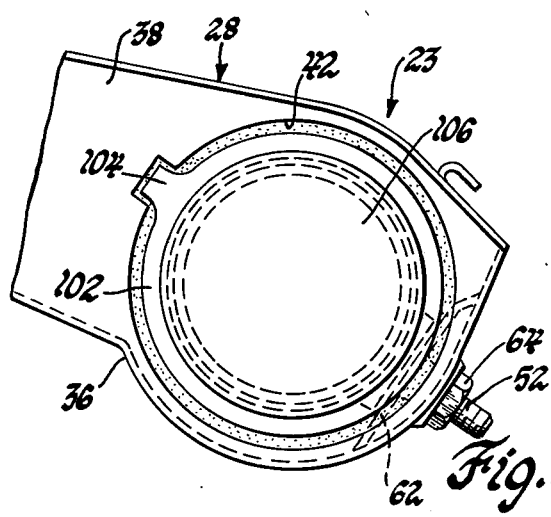
FIG. 5 is a sectional view taken on line 5—5 of FIG. 3.

Referring now to the drawings and more particularly to FIG. 1 thereof, the driver's compartment of a vehicle is shown including an instrument panel 10 located adjacent a windshield 12 and provided with a conventional steering wheel 14 rotatably mounted on a steering column 16 that extends through the fire wall and includes a steering shaft 18 for connection with the dirigible wheels of the vehicle. The instrument panel 10 includes an upper surface 20 which faces the windshield 12 and a frontal surface 22 located in generally spaced relationship to the steering wheel 14. An occupant restraint cushion system 23 is located within the upper surface 20 of the instrument panel 10 and, as seen in FIG. 3, includes a cylindrical gas generator 24 and a tubular diffuser 25 positioned within a normally folded restraint cushion 26 that is deployable rearwardly under predetermined conditions. The gas generator-diffuser combination is located in a housing 28 which is secured in position through downwardly extending strut members 30 and 32 to a rigid plate 34 fixed with the steering column 16. Although not shown, a hinged closure made of plastic material or the like normally closes the open top portion of housing 28 and is releasably held against movement upwardly relative to the latter mentioned open top portion until such time as the restraint cushion 26 is deployed.

Figure 2:
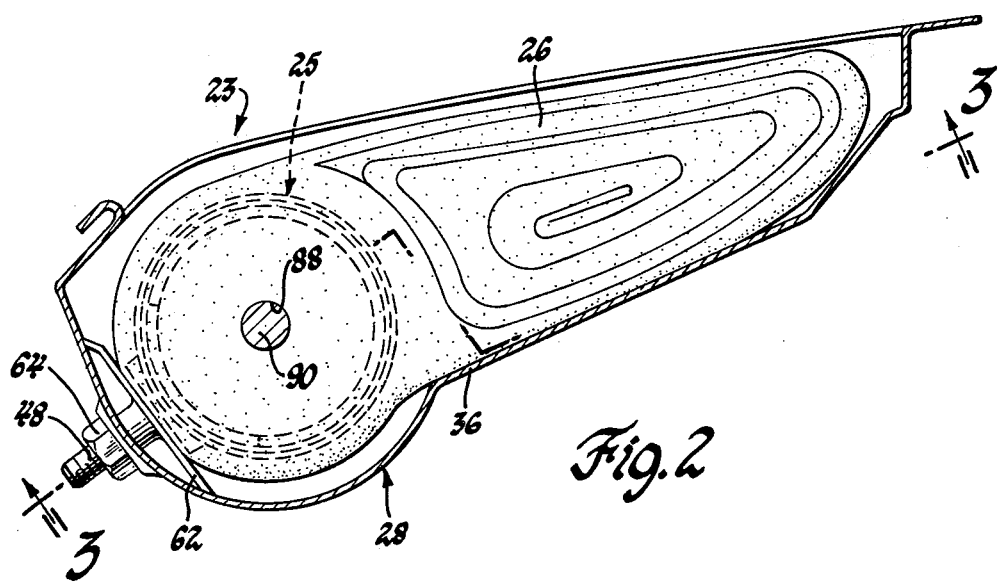
FIG. 2 is an enlarged side elevational view of the occupant restraint cushion assembly shown in FIG. 1 with one side wall removed to reveal the restraint cushion.

As best seen in FIGS. 2-5, the housing 28 comprises a J-shaped base wall 36 which is rigidly connected to a pair of latterally spaced side walls 38 and 40. The side wall 38 has an enlarged circular opening 42 formed therein while the other side wall 40 has an aperture 44 formed therein. The tubular diffuser 25 is positioned within the housing 28 and has three radially extending stud members 48, 50 and 52 fixedly connected thereto. A reinforcing plate 54 extends the length of the diffuser 25 and is welded thereto and is formed with three circular depressions 56, 58 and 60 which extend through similarly shaped openings formed in the diffuser. The depressions 56, 58 and 60 fixedly support the head ends of stud members 48, 50 and 52 respectively and the threaded ends of the latter extend through accommodating apertures formed in the base wall 36 for securing the diffuser in concentric alignment with the opening 42 and the aperture 44 formed in the side walls of the housing. In this connection, it will be noted that a support plate 62 is fixed with the base wall 36 and extends the length thereof so as to provide a flat surface against which the depression 56, 58 and 60 in the reinforcing plate 54 of the diffuser 25 can abut. Thus, when a nut 64 on each of the stud members 48, 50 and 52 is tightened, the diffuser 25 is positioned within the housing as shown in FIGS. 2 and 3.

Figure 6:
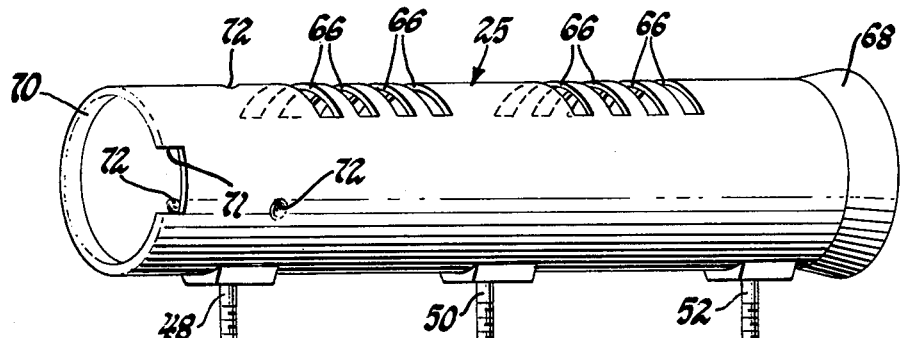
FIG. 6 is a perspective view showing the diffuser of the occupant restraint cushion assembly shown in FIGS. 1-5.

As seen in FIGS. 3 and 6, the diffuser 25 is formed with the usual axially spaced openings 66 appropriately located along the length thereof so as to provide proper distribution of gases into the compartment area of the restraint cushion 26. In addition, the diffuser 25 has one end formed with an annular radially outwardly flared conical portion 68 concentrically located relative to the circular opening 42 in end wall 38. The other end of the diffuser 25 terminates with an inwardly crimped edge 70 which has a rectangular cut-out portion 71 formed therein. Spaced from the edge 70 are three identical dimples such as dimples 72 that are equally spaced about the circumference of the diffuser 25 and serve as guide means for the gas generator 24 as will be explained hereinafter.

Figure 7:
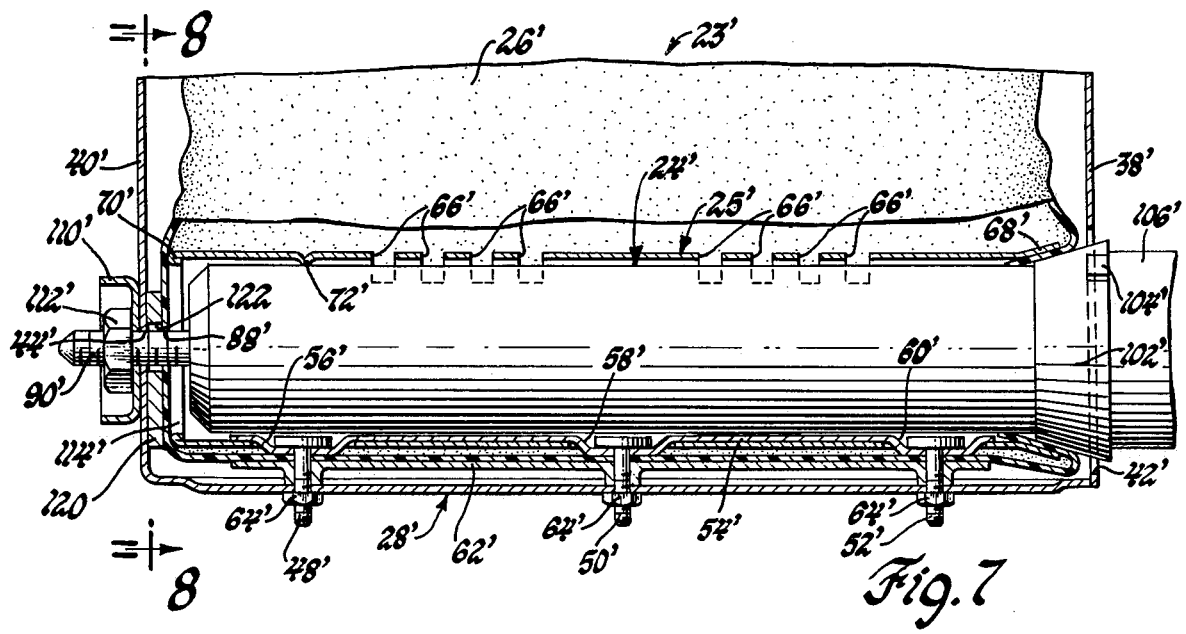
FIG. 7 shows a modified form of the occupant restraint cushion system of FIGS. 1-6.

Prior to mounting the diffuser 25 in the housing 28, the diffuser 25 is first inserted within an opening or slit formed in the mounting end of the restraint cushion 26 as seen in FIG. 7 of the aforementioned copending patent application Ser. No. 896,352, and then is located with its longitudinal axis substantially parallel to stud openings formed in the restraint cushion. The aforesaid slit in the restraint cushion 26 is then closed by sewing or otherwise and the studs 48, 50 and 52 are passed through the stud openings in the cushion material so as to locate the conical portion 68 adjacent one side wall of the restraint cushion. The aforesaid one side wall of the cushion 26 is provided with a precut circular hole 88 which is of a diameter equal to the diameter of a stud 90 formed with one end of the gas generator 24. The hole 88 is so positioned that when the stud members 48, 50 and 52 are inserted into appropriately located stud openings in the cushion 26, the opening in the conical portion 68 is concentrically aligned with the precut hole 88.

The restraint cushion 26 is made of a porous nylon material and is similar in construction to the restraint cushion disclosed in co-pending patent application Ser. No. 883,895 filed Mar. 6, 1978, entitled "Occupant Restraint Cushion" in the name of Ronald Barnett and assigned to the assignee of this invention. When inflated, the restraint cushion 26 is adapted to be deployed rearwardly and have a portion thereof extend downwardly into a position between the driver 92 and the steering wheel 14. For a more complete description of the configuration of the restraint cushion 26 reference is made to the latter mentioned patent application.

The gas generator 24 serves as a source of pressurized gas for inflating the restraint cushion 26. As seen in FIG. 3, the gas generator 24 has a cylindrical body portion 97 one end of which is formed with an annular bevel 98 and fixedly supports the aforementioned axially extending threaded stud 90. The other end of the gas generator 24 is formed with an annular tapered flange or conical head portion 102 integrally formed with a radially extending key member 104. The conical head portion 102 is integrally formed with an attached cylindrical member 106 which houses the electrical lead-in connectors for initiating firing of the gas generator. Although not shown, suitable openings are provided along the periphery of the gas generator through which the expanding gas flows for appropriate distribution by means of the axially spaced openings 66 formed in the diffuser 25.

During assembly of the occupant restraint system 23 and after the diffuser 25 has been positioned within the restraint cushion 26 as explained hereinbefore, the restraint cushion 26 is appropriately folded into a compact package which permits the combination to be positioned within the housing 28 as seen in FIG. 2. In this regard, it will be noted that the stud members 48, 50 and 52 extend through accommodating mounting holes formed in the reinforcing plate 54 and the housing 28. Once the diffuser 25 and restraint cushion 26 are located in the housing 28, the nuts 64 are tightened on each of the studs 48, 50 and 52 resulting in the flared conical portion 68 being positioned adjacent to and concentrically aligned with the enlarged opening 42 and the crimped end 70 of the diffuser abutting side wall 40. A dummy gas generator, which has an outer configuration identical to the gas generator 24 except for the absence of the stud 90, is then inserted through the enlarged opening 42 and through the hole 88 in the side wall of the restraint cushion 26 to temporarily trap the cushion material around the hole 88 between the portion of the dummy gas generator that corresponds to the conical portion 102 and the outwardly flared portion 68 of the diffuser 25. At the same time, the opposite end of the dummy gas generator traps a portion of the restraint cushion 26 against the side wall 40 and a bore formed in the dummy gas generator registers with the aperture 44. A hot probe, which is at a temperature sufficient to melt the material of the restraint cushion 26, then enters the aperture 44 and burns a hole through the restraint cushion. The assembly can then be shipped or stored for final assembly with the actual gas generator 24.

During final assembly, the dummy gas generator is removed from the housing 28 and replaced by the gas generator 24. As to the latter, initially the threaded stud 90 of the gas generator 24 moves through the enlarged opening 42 formed in the side wall 38 and through the hole 88 formed in the restraint cushion 26. The continued movement of the gas generator 24 into the diffuser 25 then causes the beveled end thereof to contact the aforementioned dimples formed in the diffuser 25 which serve to center the gas generator 24 concentrically with respect to the inner wall of the diffuser 25. The key 104 of the gas generator is located in the notch in end wall 38 so that the gas flow openings in the gas generator are properly positioned relative to the openings 66 in the diffuser 25. The threaded stud 90 of the gas generator 24 then passes through the hot probe formed opening in the restraint cushion and the aperture 44 in side wall 40 of the housing 38. Thereafter washer 110 and a nut 112 is placed on the threaded stud 90 and upon tightening causes the tapered flange or conical head portion 102 at the other end of the gas generator 24 to be drawn towards the side wall 40 to clamp and seal one side wall of the restraint cushion 26. This occurs because of the tapered flange cooperating with the flared portion of the diffuser for clamping therebetween the circumferentially spaced flap members formed by the slits in the cushion material surrounding hole 88. At the same time, the crimped end 70 of the diffuser 25 is forced against the material along the side wall 40 and provides a seal at the stud end of the gas generator. Thus, in this manner, the restraint cushion 26 is connected to the diffuser 25 and is provided with a sealed arrangement at both ends of the gas generator 24.

It will be noted that the body portion 97 of the gas generator 24 is shorter in longitudinal length than the length of the diffuser 25. Also, when the gas generator 24 is located within the diffuser 25 as seen in FIG. 3, the stud end of the gas generator is spaced from the side wall 40 and in effect forms a chamber 114 therewith surrounded by the crimped end of the diffuser. Accordingly, upon firing of the gas generator 24, pressurized gases will flow along the length of the diffuser 25 into the chamber 114 and could act on the exposed stud end of the gas generator to force the latter towards the right as seen in FIG. 3 to break the seal at the head portion 102 of the gas generator. In this case, however, a pressure build-up in chamber 114 is prevented by the cut-out portion 71 formed in the crimped end 70 of the diffuser 25 adjacent side wall 40.

Figure 8:
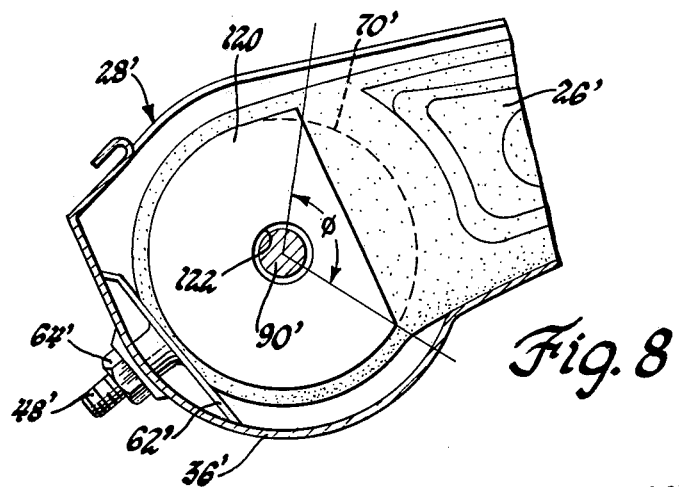
FIG. 8 is a view taken on line 8—8 of FIG. 7.
Figure 9:
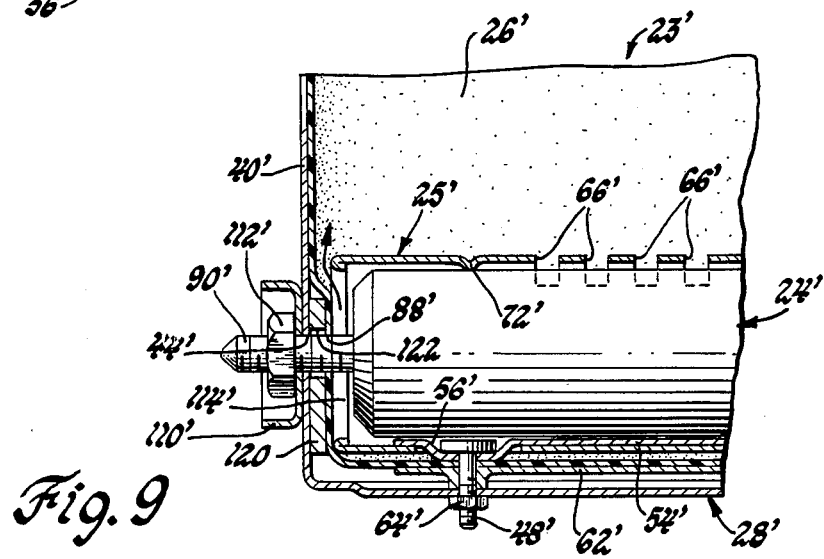
FIG. 9 is a view similar to the view in FIG. 7 but shows the position assumed by a portion of the cushion after the gas generator is fired.

FIGS. 7-9 shows a modified form of the stud end portion of the occupant restraint cushion system described above and it will be noted that all parts corresponding to the parts of the occupant restraint cushion system 23 of FIGS. 1-6 are identified by the same reference numerals but primed. With respect to the occupant restraint cushion system 23' shown in FIGS. 7-9, it will be noted that rather than having a cut-out portion formed in the end of the diffuser 25' to vent the chamber 114', such as cut-out portion 71 seen in FIG. 6, a generally semi-circular plate 120 having a thickness approximately twice the thickness of the side wall 40' with a diameter slightly greater than the outer diameter of the diffuser 25' is provided and is fixed to the side wall 40' on the inner side thereof so that the material of the cushion 26' is in engagement with the plate 120. Thus, the plate 120 is a fixed portion of the side wall 40' and is positioned in concentric relationship with the diffuser 25'. As seen in FIG. 8, the stud 90' passes through an aperture 122 formed in the plate 120 and the crimped end 70' of the diffuser 25' abuts the plate 120 through the fabric of the cushion 26' except for the portion defined by the angle $\phi$ which is equal to approximately 120°. With this arrangement, when the gas generator 24' fires, the chamber 114' is vented through the gap provided between the side wall 40' and the portion of the plate 120 not engaged by the crimped end 70' of the diffuser 25'. This can be seen in FIG. 9 with the arrow indicating the direction that the pressurized gas flows into the interior of the cushion 26'. In this manner, the chamber 114' is vented so as to prevent a pressure build-up which could cause the gas generator 24' to move to the right relative to the diffuser 25' and force the conical head portion 102' out of sealing engagement with the flared conical portion 68' of the diffuser.

Various changes and modifications can be made in this construction without departing from the spirit of the invention. Such changes and modifications are contemplated by the inventor and he does not wish to be limited except by the scope of the appended claims.

What is claimed is:

1. An occupant restraint system comprising, in combination, an elongated housing adapted to be fixedly mounted on a motor vehicle, said housing including a base wall connected to a pair of laterally spaced side walls, one of said side walls having an enlarged opening formed therein and the other side wall having an aperture formed therein, a restraint cushion having a pair of laterally spaced side walls, a diffuser located within said restraint cushion and being positioned in the housing between the end walls, means fixed with said diffuser and passing through the restraint cushion for rigidly connecting the diffuser to said base wall so as to locate said diffuser concentrically and in spaced relationship with respect to said enlarged opening in said one of said side walls of said housing, a gas generator having a body portion positioned in said diffuser and having a stud formed with one end thereof that extends through one of said side walls of said restraint cushion and through said aperture in said other side wall of said housing, an enlarged head formed with the other end of said body portion and extending out of the other of said side walls of the restraint cushion, a nut on the stud, said diffuser having a longitudinal length greater than the longitudinal length of said body portion with one end of said diffuser abutting a fixed portion of said one of said side walls of said housing and the other end abutting said enlarged head, the stud end of said body portion being spaced from said one of said side walls so as to form a chamber between said stud end of said body portion and the restraint cushion along said one of said side walls so that upon tightening of said nut on the stud the opposite ends of said diffuser cooperate with said one of said side walls of said housing and with said enlarged head respectively to provide a seal at each end of the diffuser, and a portion of said one end of said diffuser being spaced from said fixed portion of said one of said side walls of said housing so as to provide a vent for said chamber that prevents a pressure build-up therein.

2. An occupant restraint system comprising, in combination, an elongated housing adapted to be fixedly mounted on a motor vehicle, said housing including a J-shaped base wall connected to a pair of laterally spaced side walls, one of said side walls having an enlarged opening formed therein and the other side wall having an aperture formed therein, a restraint cushion having a pair of laterally spaced side walls, an elongated tubular diffuser located within said restraint cushion and being positioned in the housing between the end walls, means radially extending from said diffuser and passing through the restraint cushion for rigidly connecting the diffuser to said base wall so as to locate said diffuser concentrically and in spaced relationship with respect to said enlarged opening in said one of said side walls of said housing, a gas generator having a cylindrical body portion positioned in said tubular diffuser and having a threaded stud formed with one end thereof that extends through one of said side walls of said restraint cushion and through said aperture in said other side wall of said housing, an enlarged conical head formed with the other end of said cylindrical body portion and extending out of the other of said side walls of the restraint cushion, a nut on the threaded stud, said diffuser having a longitudinal length greater than the longitudinal length of said body portion with one end of said diffuser abutting said one of said side walls of said housing and the other end abutting said enlarged head, the stud end of said body portion being spaced from one end of said side walls so as to form a chamber between said stud end of said body portion and the restraint cushion along said one of said side walls so that upon tightening of said nut on the threaded stud the opposite ends of said diffuser cooperate with said one of said side walls of said housing and with said enlarged conical head respectively to provide a seal at each end of the diffuser, and a cut-out portion formed in said one end of said diffuser adjacent said one of said side walls of said housing so as to provide a vent for said chamber that prevents a pressure build-up therein.

* * * * *